J. H. COTTLE.
FOUNTAIN COMB.
APPLICATION FILED APR. 19, 1917.
1,232,005.
Patented July 3, 1917.
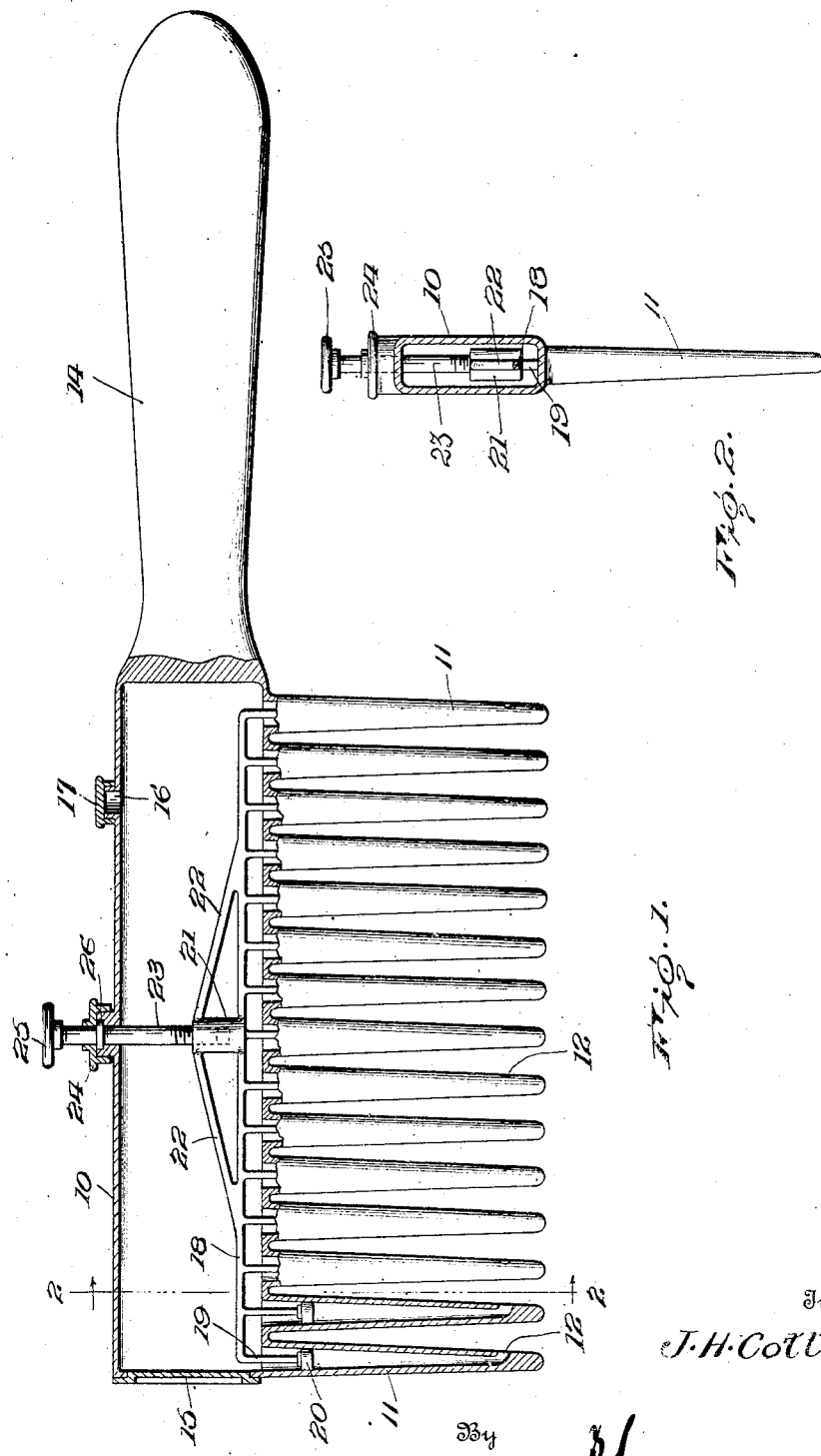

UNITED STATES PATENT OFFICE.

JOHN H. COTTLE, OF NEW YORK, N. Y.

FOUNTAIN-COMB.

1,232,005.   Specification of Letters Patent.   Patented July 3, 1917.

Application filed April 19, 1917. Serial No. 163,285.

*To all whom it may concern:*

Be it known that I, JOHN H. COTTLE, a citizen of the United States, residing at New York, in the county of New York and State of New York, have invented certain new and useful Improvements in Fountain-Combs, of which the following is a specification.

This invention relates to improvements in fountain combs, and has for one of its objects to improve the construction and increase the efficiency and utility of devices of this character.

Another object of the invention is to provide a device of this character wherein provision is made for controlling the flow of the liquid from the teeth of the comb, and to effectually increase or decrease the flow or cut off the flow entirely, as may be preferred.

With these and other objects in view, the invention consists in certain novel features of construction, as hereinafter shown and described and then specifically pointed out in the claims; and in the drawings illustrative of the preferred embodiment of the invention—

Figure 1 is a longitudinal sectional elevation of the improved device.

Fig. 2 is a transverse section on the line 2—2 of Fig. 1.

Corresponding and like parts are referred to in the following description and indicated in all the views of the drawings by the same reference characters.

The improved device comprises a hollow head represented as a whole at 10, and which constitutes the reservoir for the liquid, and a plurality of hollow teeth 11 extending from one edge of the head and communicating therewith. The interiors of the teeth taper continuously toward their free ends and are provided with discharge orifices 12, preferably spaced from the free ends of the teeth. By this means the liquid escapes from the teeth at a distance from the free ends, and will not therefore be clogged by contact with the scalp or hair.

The head member 10 is provided at one end with a handle 14 and with the other end 15 detachable to provide access for the interior of the head, to enable the valve operating devices to be inserted.

An intake orifice 16 is formed to enable the liquid to be inserted in the head, the orifice being closed by a detachable cap 17.

Located within the head 10 is a supporting member 18, and depending from the member 18 are a plurality of stems 19, one for each of the teeth 11, each stem terminating in a valve 20 within the teeth. The member 18 with its stems 19 and valves 20 are adjustable to enable the valves to be disposed in contact with the interior of the teeth 11 when moved into one position, and to detach the valves from contact with the walls of the teeth and permit the liquid to flow past them when disposed in another position. Extending from the member 18, preferably centrally thereof, is an internally threaded sleeve 21, suitably braced, as shown at 22, from the member 18. Operating through the outer wall of the member 10 is a rod or stem 23, the rod being rendered liquid-tight by a suitable packing device 24. The rod terminates in a turning disk 25, to enable it to be rotated from the exterior of the device. The rod 23 is held from longitudinal movement by any suitable means, preferably by a stop collar 26. By this means it will be obvious that when the rod 23 is rotated by force applied to the turning disk 25 the member 18 together with its stems 19 and valves 20 will be adjusted and the flow of the liquid through the teeth thereby effectually controlled. By rotating the rod 23 in one direction the valves 20 may be caused to contact with the walls of the teeth 11 and thus entirely cut off the flow, and by rotating member 23 in the opposite direction the valves may be moved toward the larger ends of the teeth and thus permit the liquid to flow past them, and by manipulating the member 23 the quantity of liquid which is permitted to pass through the teeth can be effectually controlled, and the flow increased or decreased, as required.

Having thus described the invention, what is claimed as new is:

1. A fountain comb comprising a hollow head having a plurality of hollow teeth extending from one side and communicating therewith, a supporting member movable within the head, a plurality of stems each provided with a valve seating in one of the teeth and extending from said supporting member, a threaded member carried by said supporting member, and a stem mounted for rotation through the head at the side opposite to the teeth and operative from the exterior of the head, said stem being threaded to engage in the threaded member.

2. A fountain comb comprising a hollow head having a plurality of hollow teeth extending from one side and tapered from end to end and communicating with the head, a supporting member movable within the head, a plurality of stems each provided with a valve adapted to seat against the tapering walls of one of the teeth and extending from said supporting member, a stem mounted for rotation through the head at the side opposite to the teeth and operative from the exterior of the head, and means for connecting said stem to the supporting member to move the same within the head to actuate the valves and hold them in adjusted position.

In testimony whereof I affix my signature.

JOHN H. his X mark COTTLE. [L. S.]

Witnesses:
  A. PAYNE,
  GEO. A. SMALLWOOD.